May 8, 1951  E. M. SPLAINE  2,552,121
OPHTHALMIC MOUNTING
Filed June 29, 1946
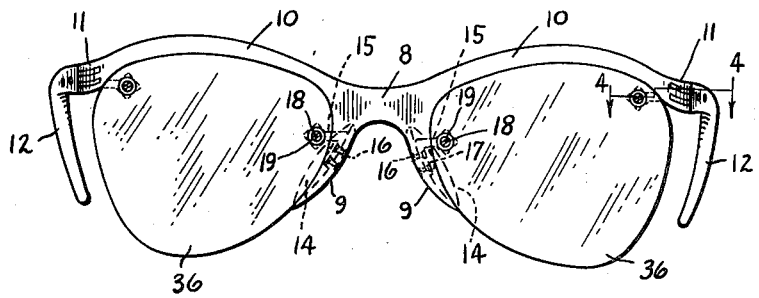
Fig. 1
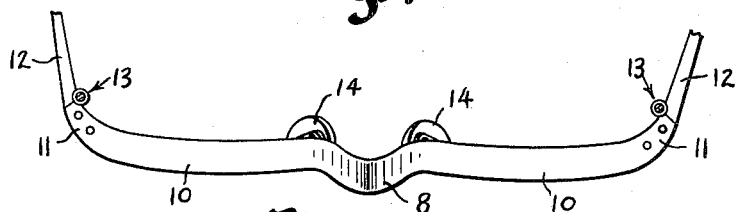
Fig. 2
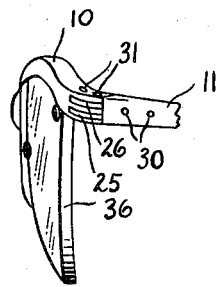
Fig. 3
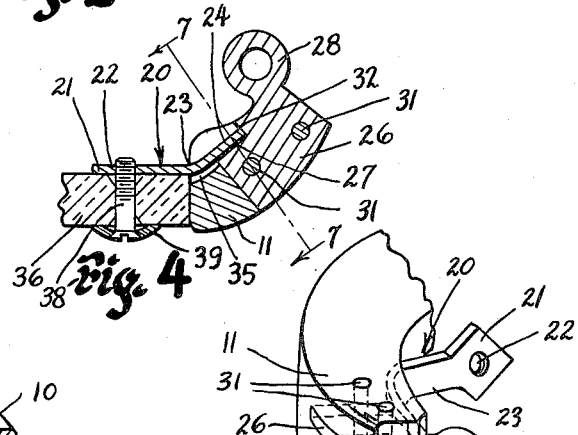
Fig. 4
Fig. 6
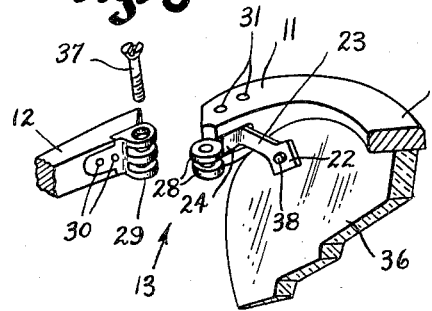
Fig. 5
Fig. 7
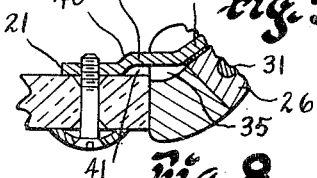
Fig. 8
INVENTOR
EDWARD M. SPLAINE
BY
Louis L. Gagnon
ATTORNEY Patented May 8, 1951

2,552,121

UNITED STATES PATENT OFFICE 2,552,121

OPHTHALMIC MOUNTING

Edward M. Splaine, Southbridge, Mass., assignor to American Optical Company, Southbridge, Mass., a voluntary association of Massachusetts Application June 29, 1946, Serial No. 680,412

2 Claims. (Cl. 88—41)

1

This invention relates to ophthalmic mountings and more particularly to a mounting embodying a semi or half-rim type structure formed preferably of non-metallic material.

One of the principal objects of the invention is to provide a semi or half-rim type ophthalmic mounting formed essentially of non-metallic material and novel means of assembling and retaining the lenses in fitted relation with said mounting.

Another object is to provide a mounting of the above character with lens strap connections on the nasal and temporal sides thereof and novel means of securing said lens straps with the lens supporting structure.

Another object is to provide resilient self-adjusting lens strap connections with the lens which will readily and automatically accommodate themselves to the surface shapes of the lenses and will retain the lens supporting structure in proper alignment with the lenses.

Other objects and advantages of the invention will become apparent from the following description taken in connection with the accompanying drawings and it will be apparent that many changes may be made in the details of construction and arrangement of parts shown and described without departing from the spirit of the invention as expressed in the accompanying claims. I, therefore, do not wish to be limited to the exact details of construction and arrangement of parts shown and described as the preferred forms are given only by way of illustration.

Referring to the drawings:

Fig. 1 is a front elevational view of a mounting embodying the invention;

Fig. 2 is a top plan view of the mounting shown in Fig. 1;

Fig. 3 is a partial side view of the mounting illustrated in Fig. 1;

Fig. 4 is an enlarged fragmentary view taken as on line 4—4 of Fig. 1 and looking in the direction indicated by the arrows;

Fig. 5 is a fragmentary rear perspective view of the lens strap and temple connection;

Fig. 6 is a rear perspective view of the lens strap on the temporal side of the mounting;

Fig. 7 is a sectional view taken as on line 7—7 of Fig. 4 and looking in the direction indicated by the arrows; and Fig. 8 is a fragmentary sectional view generally similar to Fig. 4 illustrating a modified form of the invention.

Referring more particularly to the drawings wherein like characters of reference designate

2 like parts throughout the several views, the mounting embodying the invention comprises a bridge member 8 having integrally related side portions 9 and integrally related long and slender rim portions 10 shaped to follow substantially the upper contour shape of the lenses and terminating in enlarged temporal ends 11 which extend outwardly and curve rearwardly as shown best in Fig. 2 and to which the temples 12 are pivotally connected by suitable hinge members 13. The depending side portions of the bridge 9 are provided with integrally rearwardly extending nose bearing portions 14 to which suitable lens straps 15 are attached by rivets or the like 16 which extend through openings formed in integral plates 17 formed on the lens straps 15 and through the material of the nose bearing portions 14.

The lens straps 15 are connected with the lenses by suitable lens connection means 18 such as screws or the like which extend through cupped washers 19, through aligned openings in the lenses and which are attached to the ears of the lens straps 15. The rim portions 10, as shown best in Fig. 5, are considerably thicker than the thickness of the lens. That is, they are built up in the rear of the plane of the lens to add rigidity to said rim portions and to aid in retaining said rim portions to the initial shape to which they are fabricated.

Referring more particularly to Figs. 3 through 7, the lens straps 20, on the temporal sides of the mounting or lens supporting structure, embody an ear 21 adapted to engage the rear surface of the lens and each ear 21 has a threaded opening 22 therein. The said lens straps 20 are preferably provided with a resilient intermediate portion 23 adapted to be self-adjusting to the curvature of the rear surface of the lens when being connected therewith. The said intermediate portions 23 extend rearwardly with a portion 24 which is secured to spaced plate-like members 25 and 26 by means of solder or the like 27, see Fig. 4. The spaced plate-like members 25 and 26 each have a hinge ear 28 formed thereon adapted to receive a hinge member 29 carried by the temple 12. The hinge member 29 is secured to the temple 12 by means of rivets or the like 30. The plates 25 and 26 are adapted to extend within spaced slots formed in the enlarged endpiece 11 and are secured therein by means of rivets or the like 31. The said hinge plates 25 and 26 have a shouldered cutout portion 32 formed rearwardly thereof in which the end 24 of the strap is seated and secured. The endpiece 11 is milled as illustrated at 35 to provide a clearance for the free flexing of the intermediate portion 23 of the strap to permit the ear portion 21 to fit intimately with the rear surface of the lens 36.

The hinge ears 28 and 29 are pivotally connected with each other by means of a suitable screw or the like 37, see Fig. 5. The lens 36 is provided with a connection opening, see Fig. 4, adapted to be aligned with the connection opening 22 formed in the strap ear 21. The said lens is connected with the strap ear 21 by means of a screw or the like 38 which extends through a suitable cupped washer 39 which is adapted to engage the front surface of the lens about the connection opening in said lens. The connection of the lens strap 15 with the lens is similar to that illustrated in Fig. 4.

It is to be further understood that, if desired, instead of forming the intermediate portions of the lens straps 15 and 21 resilient and self-adjusting, the said intermediate portions may be formed ductile and adjustable so as to retain the shape to which they are adjusted. It is preferable, however, that the said portions be formed resilient and self-adjusting. This is brought about by reducing the thickness of said intermediate portion by an amount sufficient to bring about this result.

In Fig. 8, there is illustrated a modified form of the invention wherein the intermediate portion 23 of the strap between the ear 21 and the end 24 solder connected with the plates 25 and 26 is provided with a relatively quick rearward bend as illustrated at 40 to provide a clearance 41 between said intermediate portion and the edge of the lens. This causes the front surface of the ear 21 to protrude outwardly toward the lens an amount greater than the front surface of the intermediate portion and causes said strap ear to engage the inner side surface of the lens only at a considerable distance spaced inwardly of the adjacent edge of the lens.

It is to be understood that both of the lens strap members 15 as well as the lens strap members 20 may be provided with this construction.

If desired, prior to assembling the plate members 25 and 26 with the temple endpiece, the contiguous surfaces of the said plate members and the spaced slots may be coated with a suitable adhesive for bringing about a more positive bond between the parts. It is particularly pointed out that the portion 24 of the strap which is soldered to the inner edges of the plates 25 and 26 prior to their assembly with the endpiece positively fixes the distance between said plates and retains them in proper spaced relation to be fitted internally of the slots. The pins 31 function to retain the parts in permanent assembled relation. It is further pointed out that the end portion 24, due to the milled out clearance 35, lies beneath the inner surface of the endpiece as best illustrated in Figs. 4 and 7 and the milled out clearance 35 is of such depth as to allow free flexing of the strap ear and intermediate portion to compensate for difference of angles of surfaces due to the difference in radii of curvatures of the inner surfaces required for different powers of lenses.

It is particularly pointed out that the pins 31 may be formed of metal but are preferably formed of non-metallic material simulating the material from which the mounting in general is made such as cellulose acetate, cellulose nitrate, methyl methacrylate or any other desirable artificial resin or plastic material. When inserting pins, when formed of plastic material, the said pins and the inner surfaces of the aligned connection openings are preferably treated with a suitable adhesive or solvent for bringing about an integral bond of the connected parts.

It is particularly pointed out that the slotted endpieces 11 or outer terminal ends of the lens rim portions 10 are located a considerable distance above a horizontal line passing through the geometrical centers of the lenses whereby the temples extend rearwardly of the lenses above the useful field of side vision. This causes the lens connection means 20 to be connected with the lenses adjacent the upper temporal sides thereof a distance considerably above the connection of the lens holding means on the nasal sides of the lenses.

While the mounting is described as having a lens supporting structure embodying integrally related rim and bridge portions which are relatively thick in cross section in a direction normal to the planes of the side surfaces of the lenses, it is particularly pointed out that the lenses, throughout the sides and bottom edges thereof, are free from visual obstructions giving the effect of a rimless mounting throughout the major portion of the useful field of vision while providing the strength and rigidity inherent to non-metallic types of mountings and the desirable, comfortable and non-corrosive characteristics of such mountings.

While spaced lens holding members or lens straps are employed for securing the lens supporting structure to the lenses, it is pointed out that the lens edge engaging portions of the mounting are so shaped and sized as to function cooperatively with the lens holding means or straps in supporting the lenses with the yielding characteristics of the material employed in the fabrication of such mountings functioning as cushioning means for relieving edge contact strain on the lenses and functioning to absorb shocks or strains.

As shown best in Fig. 3, the endpiece portion 11 is angled downwardly and rearwardly with respect to the plane of the lens and the abutting ends of the temples and endpieces 11 are disposed at an angle other than normal relative to the longitudinal axis of the side portions of the temples. It is also pointed out that the endpieces 11, as shown best in Fig. 2, are provided with inner and outer surfaces tapering toward each other as well as curving rearwardly with the taper being such as to blend said surfaces substantially with the inner and outer side surfaces of the temples. The temples, therefore, are of a thickness considerably less than the thickness of the rim portions 10 when viewed from the top. The said endpieces, however, when viewed from the side, have a thickness greater than the front edge thickness of the rim portion and the thickness of the temples when viewed from the side is greater than the front edge thickness of the rims.

From the foregoing description, it will be seen that simple, efficient and economical means and methods have been provided for accomplishing all of the objects and advantages of the invention.

Having described my invention, I claim:

1. A lens supporting structure for assembly with the lenses of an ophthalmic mounting having a connection opening in the temporal region thereof, said structure comprising a bridge having means for supporting the nasal portion of said lenses when assembled therewith and having on its opposed sides long and slender bar-like temple supports of non-metallic material each shaped to follow the top edge of a respective lens and terminating in a rearwardly extending end portion, said end portion having at least one slot formed therein, said slot being disposed in a plane substantially normal to the general plane in which the lenses are to be supported, and a hinge plate seated in said slot having an ear adjacent its outer end for connection with a temple and having spaced perforations in the body thereof, said end portion of the bar-like support having spaced openings provided in the material thereof on opposed sides of said hinge plate and in substantial alignment with the perforations formed in the hinge plate, pin-like connection members extending through said aligned openings and perforations in the body of the respective hinge plate and portions of the end portion of said bar-like supports on opposed sides thereof for securing said hinge plate to the end portion, and a lens strap having an attachment end portion fixedly secured to the adjacent inner side edge of the hinge plate at substantially right angles thereto, said attachment end portion of the lens strap and pin-like members being disposed in approximately parallel relation, and said lens strap having an intermediate portion angled inwardly from said attachment end portion thereof and having its opposed end portion shaped as a perforated ear to overlie the surface of a lens when assembled therewith, said intermediate portion of the lens strap being flexible to permit said perforated ear portion of the lens strap to be positioned in alignment with the connection opening of lenses of different curvatures and to relieve said lenses from strain due to distortion of the lens supporting structure.

2. An ophthalmic mounting comprising a pair of lenses and a central bridge having means for supporting the nasal portion of said lenses and having on its opposed sides long and slender bar-like temple supports of non-metallic material each shaped to follow the top edge of a respective lens and terminating in a rearwardly extending end portion, said end portion having a pair of slots formed therein, said slots being disposed in substantially parallel relation and in planes substantially normal to the general plane in which the lenses are supported, and a hinge plate seated in each of said slots having an ear adjacent their outer end for connection with a temple and having spaced aligned perforations in the body thereof, said end portion of the bar-like support having spaced openings provided in the material thereof on opposed sides of said hinge plates and in substantial alignment with the spaced perforations formed in the hinge plates, pin-like connection members extending through said aligned openings and perforations in the body of the respective hinge plates and end portion of the bar-like support for securing said hinge plates to the end portion, and a lens strap having an attachment end portion fixedly secured to the adjacent inner side edge of said hinge plates at substantially right angles thereto, said attachment end portion and pin-like members being disposed in approximately parallel relation, and said lens strap having an intermediate portion angled inwardly from said attachment end portion and having its opposed end portion shaped as a perforated ear to overlie the surface of a respective lens, the adjacent temporal portion of said lens having a connection opening therein, and said intermediate portion of the lens strap being flexible to permit said perforated ear portion of the lens strap to be positioned in alignment with said connection opening of the lens and to relieve said lens from strain due to distortion of the lens supporting structure.

EDWARD M. SPLAINE.

REFERENCES CITED

The following references are of record in the file of this patent:

UNITED STATES PATENTS

| Number | Name | Date |
|---|---|---|
| 1,971,128 | Braucht et al. | Aug. 21, 1934 |
| 2,034,326 | Brown | Mar. 17, 1936 |
| 2,046,706 | Sundstrom | July 7, 1936 |
| 2,243,681 | Pomeranz | May 27, 1941 |
| 2,243,768 | Spooner | May 27, 1941 |
| 2,301,328 | Rochte | Nov. 10, 1942 |
| 2,355,053 | Carlson | Aug. 8, 1944 |
| 2,357,267 | Rohrbach | Aug. 29, 1944 |
| 2,372,059 | Cook | Mar. 20, 1945 |
| 2,436,606 | Rohrbach | Feb. 24, 1948 |
| 2,463,956 | Ellestad | Mar. 8, 1949 |

FOREIGN PATENTS

| Number | Country | Date |
|---|---|---|
| 439,264 | Great Britain | Dec. 3, 1935 |
| 819,833 | France | July 19, 1937 |